United States Patent [19]

Jarsen

[11] 4,141,731

[45] Feb. 27, 1979

[54] METHOD OF CREATING A REPLICATING MATRIX

[75] Inventor: Manfred H. Jarsen, Encino, Calif.

[73] Assignee: MCA Disco-Vision, Inc., Universal City, Calif.

[21] Appl. No.: 646,053

[22] Filed: Jan. 2, 1976

Related U.S. Application Data

[62] Division of Ser. No. 402,636, Oct. 1, 1973, abandoned.

[51] Int. Cl.$^2$ ............................................. G03C 5/00
[52] U.S. Cl. ...................................... 96/35.1; 96/36; 96/38.2; 96/39; 96/44; 264/106
[58] Field of Search ................... 96/35, 44, 36, 36.1, 96/27 R, 35.1, 39, 38.2; 264/106; 156/643; 427/53

[56] References Cited

U.S. PATENT DOCUMENTS

| | | | |
|---|---|---|---|
| 3,313,626 | 4/1967 | Whitney | 96/33 |
| 3,661,580 | 5/1972 | Mayaud | 96/36.1 |
| 3,687,664 | 8/1972 | Broadbent | 96/35.1 |
| 3,794,509 | 2/1974 | Trauger et al. | 244/111 X |
| 3,795,534 | 3/1974 | Mehalso | 264/106 X |
| 3,954,469 | 5/1976 | Avanzado et al. | 96/35.1 |

Primary Examiner—Edward C. Kimlin
Attorney, Agent, or Firm—Ronald J. Clark

[57] ABSTRACT

A video disc master of glass, having a metal surface with microscopic apertures therein representing information, is coated with a photosensitive resist. The resist is uniformly exposed through the glass disc. The unexposed resist is removed. The resulting disc having surface irregularities can be used in a first process to produce "stampers" for embossing replicas and, in a second process, to produce a mold for casting replicas.

12 Claims, 5 Drawing Figures

METHOD OF CREATING A REPLICATING MATRIX

This is a division of application Ser. No. 402,636, filed Oct. 1, 1973, now abandoned.

RELATED PATENT APPLICATIONS AND PATENTS

"Articulated Mirror" by James E. Elliott, Ser. No. 333,559, filed Feb. 20, 1973, now U.S. Pat. No. 3,794,410; "Video Disc Mastering System" by John S. Winslow, Ser. No. 333,560, filed Feb. 20, 1973, now abandoned; "Video Disc Player" by James E. Elliott, Ser. No. 314,082, filed Dec. 11, 1972, now U.S. Pat. No. 3,914,541; "Video Disc Player" by James E. Elliott, Ser. No. 299,893, filed Oct. 24, 1972, now U.S. Pat. No. 3,829,622; "Video Recording and Recording and Reproducing System" by Kent D. Broadbent, Ser. No. 299,892, filed Oct. 24, 1972, now U.S. Pat. No. 3,924,062; "Drop-Out Compensator" by Wayne Ray Dakin, Ser. No. 299,891, filed Oct. 24, 1972, now U.S. Pat. No. 4,091,425; "Video Record Disc and Process for Making Same" by David P. Gregg, Ser. No. 735,007, filed Jan. 27, 1969, now abandoned; "Duplicating Process for Video Disc Records" by Kent D. Broadbent, U.S. Pat. No. 3,658,954, Issued Apr. 25, 1972; "Video Signal Transducer Having Servo Controlled Flexible Fiber Optic Track Centering" by David P. Gregg and Keith O. Johnson, U.S. Pat. No. 3,530,258, Issued Sept. 22, 1970; "Photoelectric Transducer Head" by David P. Gregg, U.S. Pat. No. 3,349,273, Issued Oct. 24, 1967; "Video Disc Playback Assembly" by Keith O. Johnson, U.S. Pat. No. 3,518,442, Issued June 30, 1970; "Duplicating Process for Video Disc Records" by Kent D. Broadbent, U.S. Pat. No. 3,687,664, Issued Aug. 29, 1972; "Reading Head for Video Disc Player" by Manfred H. Jarsen, Ser. No. 402,635, filed Oct. 1, 1973, now U.S. Pat. No. 3,947,888; "Method of Creating a Replicating Matrix" by Manfred H. Jarsen, Ser. No. 402,636, filed Oct. 1, 1973, now abandoned; "Fluid Cushion Turntable for Video Disc Player", by Manfred H. Jarsen, Ser. No. 402,634, filed Oct. 1, 1973.

BACKGROUND OF THE INVENTION

1. Field of the Invention

The present invention relates to replication of original records and, more particularly, to a method of converting a video disc master which contains information in the form of microscopic "holes" in a metal surface into a master suitable for use in producing replicas.

2. Description of the Prior Art

Over the years, there has been a continuing attempt to achieve a low cost, mass produced disc which contains video information that can be retrieved with an inexpensive home instrument for playback through a conventional television set. Early attempts at providing video information have generally involved the use of video tape recorders of various sorts as well as photographic techniques. Still other approaches have attempted to utilize thermoplastic recording or the surface alteration of a thin metallic film.

In the copending application of John S. Winslow, Ser. No. 333,560, filed Feb. 20, 1973, and assigned to the assignee of the present invention, a method and apparatus was shown for producing a video disc master, which utilized a high power laser in conjunction with a glass disc having a thin film of a relatively low melting point material, such as bismuth, coated thereon. The laser beam was intensity modulated with the video information, and at the point of impingement upon the bismuth film surface, the laser beam, at relatively greater intensities, contained sufficient energy to melt the bismuth film.

The preferred physical properties of a low melting point material, such as bismuth, are that the surface tension of the melted material should cause the molten material to immediately coalesce into small, submicroscopic nodules, thereby leaving an area substantially free of the opaque metal coating. According to the Winslow application, typical "holes" representing video information were on the order of 1 micron.

The single master thus produced cannot, in and of itself, under prior art methods and techniques, be easily utilized to produce hundreds of thousands of replicas rapidly and at low cost. Accordingly, it has been deemed desirable to somehow modify the recorded master so that replication can be easily accomplished.

In the prior art, it has been known to create "masks" with a predetermined pattern which, in turn, could be used in connection with photoetching techniques to create a plurality of duplicate surfaces, each with a similar predetermined pattern in the surface. For example, such a mask could be utilized to selectively expose discs having a very thin metal surface coating to a laser beam, and a plurality of discs having a similar "hole" pattern in the surface could be produced.

Alternatively, a photoengraving process may be employed utilizing a master mask which, through chemical etching techniques, can result in a patterned disc.

Such techniques would not be directly applicable to the needs of the video disc system as presently envisaged because of the costs involved and the time required to create the duplicates or replicas. Since the pattern dimensions closely approximate the wavelength of visible radiation, normal, high speed photographic duplication techniques would be seriously affected by diffraction effects.

SUMMARY OF THE INVENTION

According to the present invention, a glass master disc which generally has a very thin film of opaque material approximately 200–400 Å thick, which may be created in the manner taught by Winslow, supra, is spin coated with a thin film (approximately 1 micron) of a photoresist, utilizing conventional techniques. The disc is a glass, which has been lapped and polished prior to coating. The coating that is originally deposited upon the disc to create the master is only as thick as is required to provide a uniform, pinhole-free coating that is reasonably opaque to light.

The resist is then "exposed" through the recorded information by slowly rotating the reverse side of the disc in front of a radially movable, reasonably collimated ultraviolet beam. By employing a spiral exposure program, the entire disc is uniformly exposed at the intensity required to affect the photosensitive material.

The opaque coating acts as a "mask" or negative and permits light to expose the photoresist only in the areas where the metallic coating had melted to form "holes". As a result of the process, exposed photoresist is found at the hole sites. The remaining, unexposed photoresist can be easily washed away utilizing known solvents and techniques.

Depending upon the ultimate use for the matrix, the remaining metallic coating can be removed from the glass disc, utilizing an etchant which does not affect the photoresist. At the conclusion of the etching step, a hole pattern, which was approximately 400 Å deep in the opaque metal film, as determined by the thickness of that film, is now in complementary fashion reproduced as "bumps" of exposed photoresist, each "bump" being approximately 1 micron in height, which dimension is determined by the thickness of the photoresist film.

If the ultimate replica which is to be "read" utilizes reading techniques such as "phase contrast", the thickness of the photoresist, the resulting height of the bump will be determined by the desired difference in height (normally an odd multiple of one fourth the wavelength $\lambda$ of the illuminating radiation used in playback) between a relatively high and relatively low surface areas which correspond to the "hole", "no-hole" pattern. The photoresist layer can be accurately tailored as to thicknesses within one quarter of the wavelength of light to any given useful frequency.

Accordingly, the present invention can be employed in the process to produce replicas using several alternative replicating techniques all of which are useful in different alternative playback systems.

The novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

DESCRIPTION OF THE PREFERRED EMBODIMENTS

Figure 1:
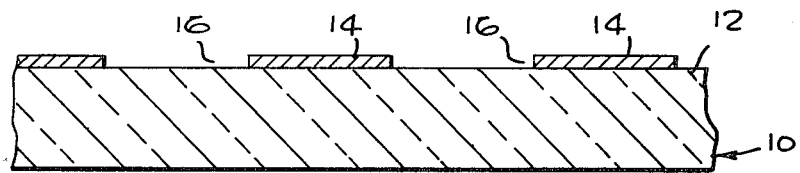
FIG. 1 is a side sectional view of a master disc having information recorded thereon.

Turning first to FIG. 1, there is shown, in side section, a portion of a master disc 10 upon which information has been recorded as taught in the copending application of John S. Winslow, supra. The disc 10, in the present invention, includes a plate glass substrate 12, the upper surface of which has been lapped and polished and to which has been added a thin film 14 of a low melting point material, such as metallic bismuth. As will be appreciated, the glass 12 is selected to be transparent to near ultraviolet radiation. Conventional plate glass has been found to be satisfactory.

During the recording process, a high-power laser beam, which has been focused down to a 1 micron spot, melts the bismuth metal in a predetermined pattern. Surface tension causes the molten metal to coalesce into small, virtually invisible globules, leaving a clear area 16 approximately 1 micron in diameter on the glass surface.

Information is thus recorded as a series of "holes" 16 in the metallic film 14, arranged in a substantially circular track. In preferred embodiments, the tracks have been spirals with a 2 micron spacing between the centers of adjacent tracks. Normally the opaque film 14 of a low melting point material is deposited at a thickness of approximately 400 Å. The film 14 need only be thick enough to assure opacity and freedom from pinholes.

Figure 2:
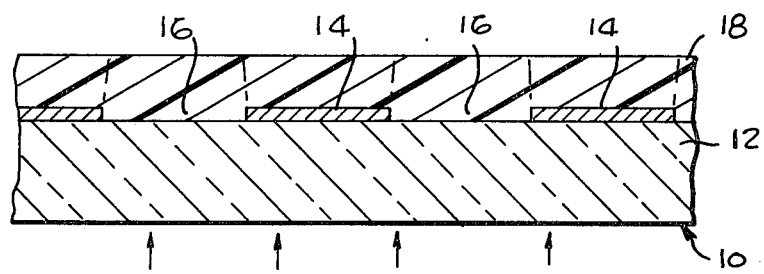
FIG. 2 is a side sectional view of the master of FIG. 1 to which a photoresist coating has been added.

Turning next to FIG. 2, the master disc 10 of FIG. 1 is uniformly coated with a photoresist compound 18 that is "spun on" to assure a uniform thickness of approximately 1 micron. The thickness of the photoresist coating 18 is determined by many parameters. The "depth" desired in the three dimensional matrix that will result at the completion of the mastering process is only one factor.

Other factors include the diameter of the individual "holes" 16, the intensity of the exposing beam, and the depth of penetration possible without degradation of resolution of the beam. Since basically a photographic process is being employed, too great a thickness of photoresist 18 might resist exposure or degrade the resolution of the pattern due to diffraction and dispersion effects within the photoresist layer 18.

A typical photoresist compound that may be used is commercially available from the Dynachem Corporation and is sold as CMR 5000. This product is conventionally used in the production of microcircuits. The selected resist is sensivitive to near ultraviolet light and, upon exposure, becomes hardened. This resist is chosen to permit operations in the laboratory with visible light. Yellow safelights can provide adequate levels of illumination without prematurely exposing the resist. The unexposed portions of the photoresist are soluble in a suitable material. The commercially available compound must be modified before it can be satisfactorily employed. One such modification is described in the copending application of Norma A. Avanzando, Manfred H. Jarsen, and Csaba K. Hunyar, Ser. No. 402,637, now U.S. Pat. No. 3,954,469.

As seen in FIG. 2, the uniform photoresist film 18 covers the metallic layer 14 to a depth of 1$\mu$. The metallic film 14 acts as a photonegative or mask for the subsequent exposure of the photoresist 18 in what is essentially a "contact" printing process. Because the resist 18 and the metallic film 14 are in intimate contact, loss of resolution through optical effects is minimized.

The disc with the resist layer applied, is sensitive to the environment, and prolonged exposure to the atmosphere degrades the quality of the resultant pattern. Accordingly, the photoresist layer is maintained in a vacuum of approximately ½ mm Hg during the exposure step. Alternatively, the photoresist layer may be kept in an inert atmosphere or a protective coating may be applied to exclude air, if the vacuum or inert environment is not convenient.

Figure 5:
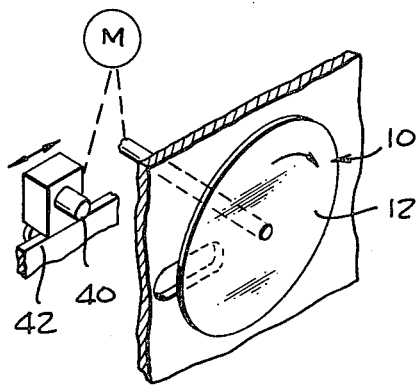
FIG. 5 is an idealized perspective view of apparatus for exposing the photoresist.

The apparatus of FIG. 5, is used to expose the photoresist. A collimated ultraviolet source 40 is mounted upon a travelling carriage 42 which is movable in a radial direction. The disc 10 is then slowly rotated, and the source 40 is translated so that a substantially uniform exposure is effected over the entire disc 10. The disc 10 is exposed from the "reverse" side, permitting the metal coating 14 to act as a mask.

In the areas of the "holes" 16 in the metal coating 14, the radiation exposes the photoresist 18, thereby hardening it. At the conclusion of the exposure step, the hole pattern in the metal film 14 has been recorded in the photoresist 18 as a pattern of relatively hardened areas.

Figure 3:
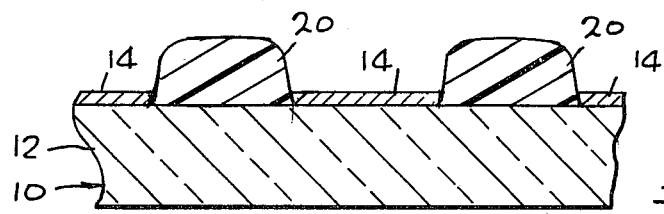
FIG. 3 is a side sectional view of a master after the metal film has been removed.

The photoresist 18 is then "developed" by washing the disc 10 with an organic solvent, such as xylene. Additional steps, not taught by the supplier must be employed and are more fully described in the Avanzando, Jarsen application, Supra. This solvent dissolves and washes away the unexposed resist, leaving a pattern of "bumps" 20, best seen in FIG. 3. These bumps 20 of exposed and hardened photoresist provide, in three dimensions, the hole pattern that originally existed in the metal coating 14 on the disc 10.

In the preferred embodiment, these bumps 20 are approximately 1 micron in height and ideally should be conical in shape. As a practical matter, the developing process tends to "round off" the areas of developed resist and a more or less rounded conical shape results. Since the pattern is ultimately "read" by reflecting light from the surface, bump shapes having a relatively low reflectivity or good scattering of direct light would provide better contrast to the reflectivity of the plane surface between adjacent bumps. Depending upon the intensity of the exposing radiation, the thickness of the resist film 18 and the nature of the "developing" fluid, the shape of the "bumps" 20 can be altered within narrow limits to improve the optical contrast between a "bump" 20 and the plane surface when a reflective system is employed for playback.

The "developed" disc is then subject to a heating or baking step to "dry out" and to stabilize the developed photoresist. Generally, the manufacturer specifies the time and temperature of such a step. In the preferred embodiment, the disc is baked for 20 minutes at 300° F. However, if the disc is to be used in a casting rather than stamping or embossing process, the baking time is increased to 30 minutes.

Figure 4:
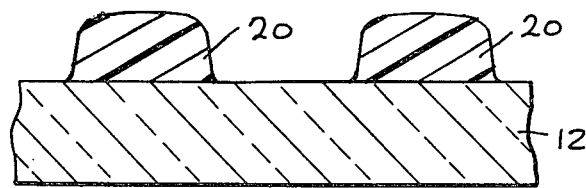
FIG. 4 is a side sectional view of the master after the metal film has been removed.

The resultant disc may be deemed a photoresist matrix, illustrated by FIG. 4, which includes the glass substrate 12 and the plurality of bumps 20 of hardened photoresist, arranged in a pattern representing the information that originally existed in the metal coating 14 on the disc 10.

The resulting photoresist matrix of FIG. 4 is then the starting point for alternative replication processes which would produce different replica disc having substantially the same optical qualities. A first, stamping or embossing process utilizes the photoresist matrix in a first series of steps which produce successively a "mother", a "submaster", and a "submother" from which a plurality of "stampers" can be fabricated.

If the master is to be used in such a stamping process, the remaining metal 14 is then dissolved or etched, using a more or less conventional etching solution, such as an aqueous solution of sulfuric acid and hydrogen peroxide ($H_2SO_4/H_2O_2$).

The individual stampers are then placed in a suitable press, and replicas are produced in a fashion similar to the production of phonograph records. One embossing method is taught in the copending application of David P. Gregg, entitled "Video Record Disc and Process for Making Same", Ser. No. 735,007, filed June 6, 1968. Video disc replicas are produced from discs of a thermoplastic material, such as vinyl, rather than from a "biscuit". The vinyl disc is heat and pressure embossed to receive either the "bump" pattern or a complementary "hollow" pattern associated with the stamper. It is immaterial to the playback of the information whether the replica is provided with "bumps" or "hollows".

An alternative replication process might be deemed a "casting" process. For this process, the metal coating is not removed after the baking step. In a second series of steps, the photoresist matrix is coated with a release agent and then covered with a silicone rubber compound to a depth of from 10 to 15 mils. Following a heat curing step, the cured silicone rubber becomes a mold which is then separated from the photoresist matrix.

If the photoresist matrix is carefully handled, this mold making process may be repeated for as long as the photoresist matrix remains intact. The mold is used in conjunction with a polymer and a Mylar polyester film substrate to produce replicas.

The polymer is cured in the silicone rubber mold after it has been applied to the polyester film substrate. The polymer layer can be from $3\mu$ to 1 mil thick, depending upon the substrate used. The resultant replicated disc consists of a polyester substrate of from 4 to 10 mils thickness with a thin layer of cured polymer, which exhibits the bump pattern of the photoresist matrix.

If the photoresist matrix is damaged by the mold making process, the mold itself can be used to make one or more "submatrices" by casting an acrylic disc from which yet other silicone rubber molds may be made. A plurality of "submolds" are then available for the casting of replicas, and the number of molds, "submatrices" and "submolds" which can be created is limited only by the loss in resolution, resulting from each reproduction step.

Thus there has been described a process and product which is a necessary first step in the mass production of replicated video discs which can then be utilized on playback equipment to provide a video program through a conventional television receiver. The process includes the provision of a photoresist layer adjacent the metal layer which has been written upon by the mastering, high-power laser. The photoresist is then exposed through the disc. The exposure pattern is developed and hardened.

For use with a stamping process, the remaining metal is removed and a series of plating and separating steps are employed to produce, in succession, the various precursor elements that result in "stampers". A casting process employs a longer baking step and does not remove the remaining metal layer, but only because the developed photoresist may have a longer useful life for producing silicone rubber molds of the photoresist surface.

In alternative embodiments, other "positive" type photoresist compounds could be employed which, when developed, result in a surface having holes or depressions in the areas corresponding to the "holes" in the metallic surface. However, the uniformity of the surface of the remaining photoresist could not be assured, and replicas produced by the process might not exhibit a smooth, uniform reflecting surface in the areas adjacent either "bumps" or "holes".

What is claimed as new is:

1. A process of operating upon a substrate body to record video information thereon in the form of a replicating matrix, said process comprising the steps of:
providing a transparent substrate member having an upper surface and a lower surface, and said upper surface being lapped and highly polished, and said lower surface being substantially parallel with said upper surface;
forming an opaque layer over said upper surface;
forming a plurality of successively positioned apertures in said opaque layer for representing the recorded video information and exposing a portion of said upper surface in each aperture;

forming said apertures with a uniform width;

forming a continuous coating of substantially uniformly thick photosensitive material upon the remaining surface of said first layer and said exposed portions of said substrate;

limiting the thickness of said photosensitive material to that substantially the same as the uniform width of said apertures;

exposing that portion of the photosensitive coating positioned upon said upper surface of said substrate to actinic radiation entering through said lower surface and passing through said transparent substrate; and forming a photoresist bump in each aperture by developing and removing the unexposed portion of said photoresist layer.

2. A process of operating upon a body to record video information thereon of the type that is subsequently read by means of an impinging light beam, comprising the steps of:

providing a transparent, disc shaped body having an upper surface and a lower surface, and said upper surface being lapped and highly polished, and said lower surface being substantially parallel with said upper surface;

forming a uniformly thick opaque coating upon said surface;

forming a pattern of holes in said coating, for representing the recorded video information and each such hole exposes an underlying portion of said upper surface;

forming each hole with a uniform width;

applying a layer of photoresist material uniformly over the resulting surface of said body including said remaining portions of said opaque coating and said portions of said upper surface which are exposed in said pattern of holes formed in said coating;

said photoresist having two stable states and one of said states being in a polymerized state and a second of said state being in an unpolymerized state;

providing a source of illumination having a power level and wavelength suitable for exposing said photoresist and unsuitable for penetrating said portions of said opaque layer remaining on said upper surface;

exposing that portion of the photoresist of said substrate to actinic radiation entering through said lower surface and passing through said transparent substrate; and forming a plurality of individual, elevated photoresist regions by removing the unpolymerized portion of said photoresist.

3. The process as recited in claim 2 wherein said photoresist is a negative photoresist and said step of forming a plurality of individual, elevated photoresist regions polymerizes said negative photoresist exposed in the holes formed in the opaque layer, and said removal step removes that portion of said unpolymerized photoresist layer lying in contact with said opaque layer.

4. The process as recited in claim 2, wherein said photoresist is a positive photoresist and said step of forming a plurality of individual elevated photoresist regions unpolymerizes said positive photoresist exposed in the holes formed in the opaque layer, and said removal steps removes said unpolymerized, exposed portion of said photoresist layer and leaves intact said polymerized portion of said photoresist layer laying in contact with said remaining portion of said opaque layer.

5. A process of operating upon a body to record video information thereon of the type that is subsequently read by means of an impinging light beam, comprising the steps of:

providing a transparent, disc shaped substrate having an upper surface and a lower surface, and said upper surface being highly polished and lapped and said lower surface being substantially parallel with said upper surface;

forming an opaque, pinhole free coating upon said upper surface;

forming a spirally shaped, pattern of holes in said coating for exposing underlying portions of said upper surface;

arranging the spacing of said holes to represent recorded video information;

determining the desired thickness of a layer of photoresist to be equal to an odd multiple of $\frac{1}{4}$ of the wavelength of the reading light beam;

applying said predetermined thickness of photoresist uniformly over the combined surface of said coating and said exposed surface regions;

providing a source of illumination which is suitable for exposing said photoresist and which is unsuitable to penetrate the remaining regions of said coating;

positioning said disc with relation to said source for illumination from said source to impinge upon said lower surface and pass through said disc to react with that portion of the layer of photoresist positioned in contact with said upper surface of said disc; and forming a pattern of conically shaped photoresist bumps from said photoresist layer lying above said exposed glass surface by removing the unreacted portion of said photoresist layer.

6. The process as recited in claim 5, and further including:

preparing the resulting conically photoresist bumps for an additional processing step by heating the resulting structure including said substrate and the remaining portion of said opaque layer and the conically shaped bumps by heating said resulting structure for a time and temperature suitable for stabilizing said photoresist.

7. A process of operating upon a substrate body of predetermined transparency to record video information thereon and to produce a substantially three-dimensional replicating matrix, said process comprising the steps of:

coating one surface of the substrate body with a uniformly thick film of opaque material to a thickness of approximately 400 Å;

sequentially removing successive positioned portions of said coating in a predetermined pattern of apertures for representing the recorded video information and for exposing portions of said one surface of said body in those areas from which said portion of said coating are removed;

forming said apertures with a uniform width not exceeding one micron;

applying a coating of substantially uniformly thick photosensitive material of measured thickness approximating one micron over said resulting surface of said substrate body for covering both said remaining opaque material and said exposed portions of said one surface exposed in said apertures;

exposing said photosensitive material to actinic radiation through the transparent substrate body and through said pattern of apertures;

developing said photosensitive material; and selectively removing photosensitive material in a pattern faithfully corresponding to said pattern of opaque and radiation transmitting surface areas of the substrate body for forming a three dimensional replicating matrix in which the original thickness dimension of said opaque layer is enhanced by more than a factor of ten for representing the recorded video information.

8. The process as recited in claim 7, wherein said developing step removes unexposed photosensitive material overlying the opaque surface areas of said substrate body and leaves bumps of exposed photosensitive material overlying the apertures in the thin film of opaque material.

9. The process as recited in claim 7, wherein said developing step removes exposed photosensitive material leaving holes in said photosensitive material overlying said apertures in said thin film of opaque material.

10. The process as recited in claim 7, wherein said applying step includes the step of applying said photosensitive material in a layer approximately n ($\lambda/4$) thick, where $\lambda$ is the wavelength of radiation to be used for reading the information and "n" is an odd integer.

11. A process of operating upon a substrate body to record video information thereon in the form of a replicating matrix, said process comprising the steps of:

providing a transparent substrate member having an upper surface and a lower surface, and said lower surface being lapped and highly polished, and said lower surface being substantially parallel with said upper surface;

forming an opaque layer over said upper surface;

forming a plurality of successively positioned apertures in said first layer for representing the recorded video information and exposing a portion of said upper surface in each aperture;

forming said apertures with a uniform width;

forming said apertures by melting portions of said opaque layer by modulating the intensity of a laser beam with the video information;

forming a continuous coating of substantially uniformly thick photosensitive material upon the remaining surface of said first layer and said exposed portions of said substrate;

limiting the thickness of said photosensitive material to that substantially the same as the uniform width of said apertures;

exposing that portion of the photosensitive coating positioned upon said upper surface of said substrate to actinic radiation entering through said lower surface and passing through said transparent substrate; and forming a photoresist bump in each aperture by developing and removing the unexposed portion of said photoresist layer.

12. A process of operating upon a substrate body to record video information thereon in the form of a replicating matrix, said process comprising the steps of:

providing a transparent substrate member having an upper surface and a lower surface, and said upper surface being lapped and highly polished, and said lower surface being substantially parallel with said upper surface;

forming an opaque layer over said upper surface;

forming a plurality of successively positioned apertures in said first layer and exposing a portion of said upper surface in each aperture;

forming said apertures with a uniform width and forming the spacing between adjacent apertures in a pattern representing the recorded video information;

forming a continuous coating of substantially uniformly thick photosensitive material upon the remaining surface of said first layer and said exposed portions of said substrate;

limiting the thickness of said photosensitive material to that substantially the same as the uniform width of said apertures;

exposing that portion of the photosensitive coating positioned upon said upper surface of said substrate to actinic radiation entering through said lower surface and passing through said transparent substrate; and forming a photoresist bump in each aperture by developing and removing the unexposed portion of said photoresist layer.

* * * * *